United States Patent Office 3,019,206
Patented Jan. 30, 1962

3,019,206
POLYBLENDS OF A THERMOPLASTIC TETRA-FLUOROETHYLENE POLYMER LATEX AND AN ELASTOMERIC FLUOROCARBON POLYMER LATEX AND ARTICLE COATED THEREWITH
Lester Eugene Robb, Westfield, N.J., assignor to Minnesota Mining and Manufacturing Company, St. Paul, Minn., a corporation of Delaware
No Drawing. Filed Sept. 24, 1958, Ser. No. 762,942
9 Claims. (Cl. 260—29.6)

This invention relates to blends of polytetrafluoroethylene and fluorine-containing elastomers and a method for their production. In one aspect this invention relates to a blend of a polytetrafluoroethylene latex and a fluorine containing elastomer latex. In another aspect this invention relates to a blend of a polytetrafluoroethylene latex and a perfluorohaloolefin elastomeric copolymer latex. In still another aspect this invention relates to a method for making a blend of a polytetrafluoroethylene latex and a fluorine-containing elastomer latex. A further aspect relates to a new and improved coating composition with thermal and chemical resistance as well as good release properties.

Polytetrafluoroethylene is desirable as a coating in many applications because of its low coefficient of friction to a wide variety of metallic and other surfaces, as well as its heat and chemical resistance. It has heretofore also been widely used in such applications as pump seals, packing, gaskets, etc. However, tetrafluoroethylene homopolymers, such as Teflon 30, are not film forming at room temperatures, and to obtain a continuous film having any degree of mechanical strength a very thin layer of the polytetrafluoroethylene particles (usually less than 0.002 inches in thickness) must be deposited on the substrate and then heated above the fusion point of the polymer, i.e. about 327° C., to fuse the particles. If films of greater than the critical thickness are formed, cracks in the polytetrafluoroethylene film result. Moreover, the high fusion temperatures constitute a serious limitation in the application of such films to certain substrates. For example, a tetrafluoroethylene polymer such as Teflon 30, cannot be applied and fused to fabrics, such as cotton, nylon, etc. because of the thermal degradation of the substrate when subjected to fusion temperatures of 327–350° C.

It is therefore an object of this invention to provide a coating composition having both release properties and chemical and thermal resistance.

It is another object of this invention to provide a blend of a polytetrafluoroethylene latex and a fluorine-containing elastomer latex.

It is still another object of this invention to provide a method for producing a blend of a polytetrafluoroethylene latex and a perfluorohaloolefin elastomer latex.

It is a further object of this invention to provide a method for depositing a continous coating of a blend of polytetrafluoroethylene and a perfluorohaloolefin elastomer on a substrate.

It is an additional object of this invention to provide a substrate coated with a fluorine-containing elastomer matrix in which tetrafluoroethylene polymer particles are embedded.

Various other objects and advantages will become apparent to those skilled in the art on reading the accompanying description and disclosure.

In general, the above objects are accomplished by blending a latex of tetrafluoroethylene thermoplastic polymer with a latex of a fluorine-containing elastomeric copolymer. As used in this invention "tetrafluoroethylene thermoplastic polymer" includes tetrafluoroethylene homopolymer as well as tetrafluoroethylene polymerized with up to about 5 mole percent of other fluorinated olefins, such as vinylidene fluoride.

The elastomeric copolymers which may be used in accordance with this invention are capable of forming films from solutions at room temperature and generally have molecular weights above about 25,000, usually above 50,000. The elastomers are copolymers of a perfluorohaloolefin containing between 2 and 5 carbon atoms with a halogenated hydrogen-containing olefinic comonomer having between 2 and 5 carbon atoms. Preferably both monomers are monoolefins with from 2 to 3 carbon atoms. Illustrative of such perfluorohaloolefins are trifluorochloroethylene, trifluorobromoethylene, perfluoropropene, tetrafluoroethylene, 1,1-dichloro - 2,2 - difluoroethylene, chloropentafluoropropene. Illustrative of such halogenated hydrogen-containing olefinc comonomers are vinylidene fluoride, chloroprene, fluoroprene, 1-chloro-1-fluoroethylene, and vinyl fluoride. The preferred hydrogen-containing olefins are the fluorinated hydrogen-containing olefins, particularly the fluorinated hydrogen-containing ethylenes. In a particularly preferred embodiment the perfluorohaloolefin is either trifluorochloroethylene or perfluoropropene and the halogenated hydrogen-containing olefin is vinylidene fluoride. Elastomeric copolymers of trifluorochloroethylene and vinylidene fluoride contain trifluorochloroethylene in an amount between about 20 and about 69 mole percent, preferably between about 25 and about 50 mole percent. Such copolymers are described in U.S. Patent 2,752,331. Elastomeric copolymers of perfluoropropene and vinylidene fluoride contain from about 15 to about 60 mole percent of perfluoropropene and may be produced from the polymerization of an initial monomer charge containing between about 20 and about 80 mole percent of perfluoropropene at a temperature between about 0° C. to 100° C. and a pH between about 2 and about 10. Latices of these polymers are usually produced by polymerization of the respective monomers in an aqueous emulsion-type system, although a non-aqueous, mass or bulk polymerization may be used. A free radical forming promoter, such as azo compounds, inorganic and organic peroxides, or an ionic type promoter, such inorganic halides of the Friedel-Crafts catalysts type, are usually employed in such polymerization systems. Emulsifiers, such as halogenated aliphatic carboxylic acids and salts, are also generally incorporated into the aqueous polymerization bath. If desired, activators, usually water soluble reducing agents, as well as accelerators, such as water soluble variable valence metal salts, may also be present. The specific techniques and conditions of such polymerizations are not within the scope of this invention and therefore no further elaboration is necessary.

The latices of polytetrafluoroethylene and elastomer can contain widely varying polymer solids content and can be mixed together in any proportion. However, generally the blended latex has a polytetrafluoroethylene-elastomer ratio from about 1:1 to about 1:200 parts by weight, usually from about 1:2 to about 1:20 parts by weight. The particular ratio selected for the blend as well as the total solids content depends primarily on the type of film desired and the method of application. A significant factor that controls the properties of the blend, other than the properties of the respective polymers, is the intimate mixing of polymers obtained by blending latices having a particle size of exceedingly small dimensions, usually less than 1 micron.

The latex blends of this invention may be used without further treatment to coat various substrates, as hereinafter described. Thus, for example, depending on the viscosity of the resultant latex blend, the latex composition can be applied by such methods as spraying, knife coating, dipping, etc. For each method, the solids content may be varied to obtain the most advantageous viscosity, or thickening agents such as ammonium acrylate and methyl cellulose may be added. Where the latex blend is not to be be used for a considerable period of time, it may also be desirable to add a latex stabilizing agent, such as a fluorinated carboxylic acid or salt. Other suitable stabilizers include the sodium salt of sulfonated methyl taurine (Terginol-G), aryl alkyl polyethers (Triton X-100), amine acetates, etc. Other inert fillers, such as silica and carbon black, or heat stabilizers, such as metal oxides and sulfides, e.g. zinc oxide, cobalt oxide, etc., may also be added.

The latex blends of this invention may also be coagulated and dried to form a homogeneous mixture of polytetrafluoroethylene and elastomer. Unlike polytetrafluoroethylene alone, this blended material may be compounded, molded, and vulcanized in the same manner as the elastomer above. It is not necessary that the elastomer molecules be cross-linked to be useable in the practice of this invention. However, cross linking can be effected, if desired, by addition of a vulcanizing agent (e.g. polyamines such as hexamethylenediamine, triethylene, tetramine, tetraethylene pentamine, etc.; organic peroxides such as benzoyl peroxide, parachlorobenzoyl peroxide, etc.; inorganic peroxides such as magnesium peroxide, zinc peroxide, etc.) to either the latex blend or the coagulated dried polymer mixture and then curing, thereby to enhance such properties as mechanical strength and abrasion resistance. Vulcanization promoters, such as zinc oxide, lead oxide, etc., are used in the conventional manner. Since vulcanization can be carried out at temperatures as low as 250° F., usually in the 275° F. to 400° F. range, the blended polymers of this invention can be applied to and cured on a wide variety of substrates which normally cannot be coated with polytetrafluoroethylene latex alone.

After application of the latex blend to a substrate the resulting film or impregnant is dried. Although the elastomer in the blended latex is film forming at room temperature, baking at temperatures between about 250° F. and the decomposition temperature of the elastomer is usually employed to complete the drying. Where vulcanization or curing agents are used, such baking is necessary to promote the chemical curing reactions, as mentioned earlier.

The latex blends herein disclosed may be utilized to coat subtrates of metal (such as steel, brass, copper, etc.) of wood, of rubber, of plastics (such as polyethylene) and of fabrics, both synthetic and natural (such as cotton, nylon, wool, Dacron, and fiberglass). Coatings or films produced from these latex blends comprise discrete finely divided particles of polytetrafluoroethylene embedded in a matrix of the elastomer which forms the continuous phase. Such blends may also be used as saturants for braided wire insulation, or for braided packing material, such as asbestos, for use in stuffing boxes of seals of pumps, valves, and rotating shafts of all types. Here the elastomer again acts as a binder for the polytetrafluoroethylene. The thermal stability of the film, coating, or impregnant is directly related to the type of elastomer used. Thus, if a trifluorochloroethylene-vinylidene fluoride (1/1 mole ratio) polymer is employed as the elastomer, the film or impregnant will withstand temperatures of 425° F. without degrading, while a latex blend containing a perfluoropropene-vinylidene fluoride elastomer will produce a film capable of withstanding temperatures of 475° to 500° F. without degradation. Because of the presence of polytetrafluoroethylene particles coatings produced from the latex blend of this invention also display good release properties without the concomitant disadvantages of polytetrafluoroethylene. The elastomer not only allows the preparation of a continuous film but also permits the use of bonding or adhesive systems, such as epoxy tie coats, to promote improved bonding of the fluorocarbon film to certain substrates, particularly metal substrates. If desired, additional coatings can be applied to the polytetrafluoroethylene-elastomer layer or undercoat. Thus it is within the scope of this invention to apply additional coats of fluorocarbon polymer such as a latex of polytetrafluoroethylene.

In order to illustrate the invention, the following examples are presented. These examples are offered for purposes of illustration and are not to be construed as necessarily limiting.

*Example I*

This example illustrates the preparation of a blend of a trifluorochloroethylene-vinylidene fluoride elastomer latex with a polytetrafluoroethylene latex. A blend of the respective aqueous latices, stabilizer, and cross-linking agent was prepared according to the following recipe:

| Recipe | Percent Solids by wt. | Weight (gm.) | |
|---|---|---|---|
| | | Wet | Dry |
| trifluorochloroethylene - vinylidene fluoride latex (30/70 mol ratio) | 65 | 155 | 100 |
| tetrafluoroethylene homopolymer latex | 50 | 40 | 20 |
| zinc oxide dispersion | 50 | 14 | 7 |
| hexamethylenediamine | 70 | 0.8 | 0.56 |

After the ingredients of the above recipe were thoroughly mixed the resulting compounded latex blend was applied to a fiberglass mat by dipping the mat into the latex, scraping the excess from the surface and drying at 250° F. for 15 minutes. The latex was then cured by placing the saturated mat in an air oven at 300° F. for 2 hours.

The latex film at the surface of the mat was continuous and well bonded. In addition, the surface displayed a low coefficient of friction, or slippery nature, characteristic of polytetrafluoroethylene.

*Example II*

This example illustrates the preparation of a blend of a perfluoropropene-vinylidene fluoride elastomer latex with a polytetrafluoroethylene latex. The aqueous latex blend was prepared as follows:

A creamed perfluoropropene vinylidene fluoride (80 mole percent vinylidene fluoride) elastomer latex containing 60% solids by weight was stabilized with the potassium salt of 3,5,7,8 tetrachloro, unadecafluoro caprylic acid and its pH adjusted with a 7% KOH solution to pH 9.0. To 80 grams of this latex (48 grams of elastomer solids) was blended 25 grams of a tetrafluoroethylene homopolymer latex (Teflon 30) having a solids content of 50% by weight, to give approximately a 20/80 weight ratio of polytetrafluoroethylene to elastomer on a polymer solids basis.

Fiberglass cloth was dipped into this blended latex, dried at 180° F., and the resultant film baked in an air circulating oven for 10 minutes at 400° F. The film produced was continuous and well bonded to the fiberglass substrate. No phase separation of the polytetrafluoroethylene particles from the elastomer binder was evident. The surface of the film was glossy and possessed the low coefficient of friction characteristic of polytetrafluoroethylene.

As indicated previously, the blended composition of this invention is produced by admixing a tetrafluoroethylene homopolymer latex and a latex of a perfluorohaloolefin elastomer, preferably a copolymer of vinylidene fluoride with either trifluorochloroethylene or perfluoropropene.

Various alterations and modifications of the invention and its aspects may become apparent to those skilled in the art without departing from the scope of this invention.

I claim:
1. A coating composition which comprises an admix- ture of an aqueous latex of a thermoplastic polymer, said polymer selected from the group consisting of tetrafluoroethylene homopolymer and a copolymer of tetrafluoroethylene and up to about 5 mole percent of a fluorinated olefin copolymerizable therewith, and an aqueous latex of an elastomeric copolymer of vinylidene fluoride and a member of the group consisting of perfluoropropene and trifluorochloroethylene, the weight ratio of said thermoplastic polymer to said elastomeric copolymer being from about 1:1 to about 1:200.

2. A coating composition which comprises an admixture of an aqueous tetrafluoroethylene homopolymer latex and an aqueous latex of a trifluorochloroethylene-vinylidene fluoride elastomer having from about 20 to about 69 mol percent trifluorochloroethylene, the weight ratio of said homopolymer to said elastomer being from about 1:1 to about 1:200.

3. The composition of claim 2 having therein a vulcanizing agent selected from the group consisting of polyamines and peroxides.

4. A novel composition which comprises an admixture of a tetrafluoroethylene homopolymer aqueous latex with an aqueous latex of a trifluorochloroethylene-vinylidene fluoride elastomer, the weight ratio of said homopolymer to said elastomer being from about 1:1 to about 1:200.

5. A coating composition which comprises an admixture of an aqueous tetrafluoroethylene homopolymer latex and an aqueous latex of a perfluoropropene-vinylidene fluoride elastomer having from about 15 to about 60 mol percent perfluoropropene, the weight ratio of said homopolymer to said elastomer being from 1:1 to about 1:200.

6. The composition of claim 5 having therein a vulcanizing agent selected from the group consisting of polyamines and peroxides.

7. An article having on its surface a continuous homogeneous coating comprising a matrix of an elastomeric copolymer of vinylidene fluoride and a member of the group consisting of perfluoropropene and trifluorochloroethylene, in which matrix is dispersed finely divided particles of a thermoplastic polymer, said polymer selected from the group consisting of tetrafluoroethylene homopolymer and a copolymer of tetrafluoroethylene and up to about 5 mole percent of a fluorinated olefin copolymerizable therewith, the weight ratio of said thermoplastic polymer to said elastomer being from about 1:1 to about 1:200.

8. An article having on its surface a continuous homogeneous coating comprising a matrix of a trifluorochloroethylene-vinylidene fluoride elastomer having from about 20 to about 69 mol percent trifluorochloroethylene, in which finely divided particles of tetrafluoroethylene homopolymer are dispersed, the weight ratio of said homopolymer to said elastomer being from about 1:1 to about 1:200.

9. An article having on its surface a continuous homogeneous coating comprising a matrix of a perfluoropropene-vinylidene fluoride elastomer having from about 15 to about 60 mol percent perfluoropropene, in which finely divided particles of tetrafluoroethylene homopolymer are dispersed, the weight ratio of said homopolymer to said elastomer being from about 1:1 to about 1:200.

References Cited in the file of this patent

UNITED STATES PATENTS

| | | |
|---|---|---|
| 2,510,112 | Holbrook | June 6, 1952 |
| 2,681,324 | Hochberg | June 15, 1954 |
| 2,775,569 | Dipner | Dec. 25, 1956 |
| 2,866,721 | Hetherington | Dec. 30, 1958 |
| 2,878,196 | Buffington | Mar. 17, 1959 |